(No Model.)
J. T. BROWN.
INSTRUMENT FOR MEASURING DISTANCES.
No. 601,493. Patented Mar. 29, 1898.
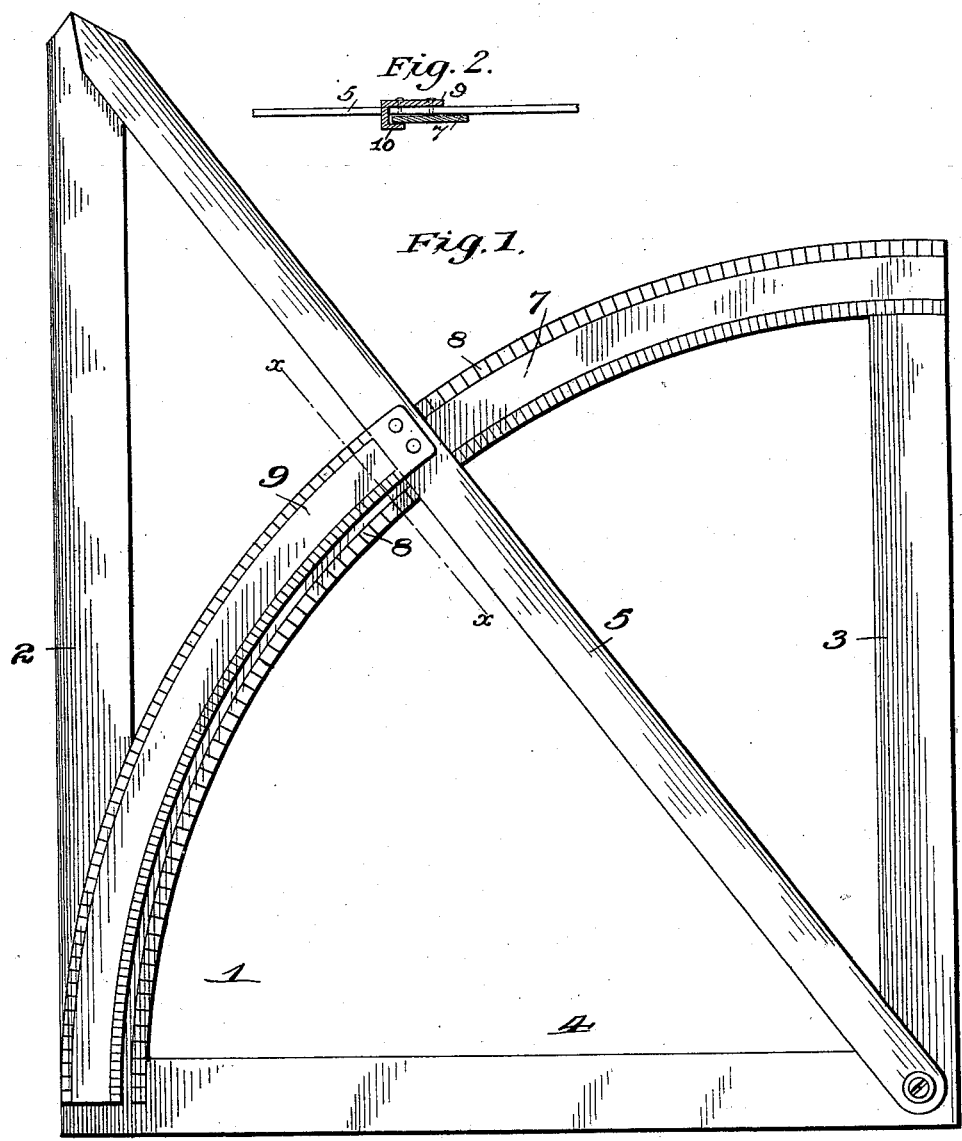
WITNESSES
INVENTOR
Joseph T. Brown,
By John Hedderburn
Attorney

UNITED STATES PATENT OFFICE.

JOSEPH T. BROWN, OF HOUSTONIA, MISSOURI.

INSTRUMENT FOR MEASURING DISTANCES.

SPECIFICATION forming part of Letters Patent No. 601,493, dated March 29, 1898.

Application filed March 29, 1897. Serial No. 629,679. (No model.)

*To all whom it may concern:*

Be it known that I, JOSEPH T. BROWN, of Houstonia, in the county of Pettis and State of Missouri, have invented certain new and useful Improvements in Instruments for Measuring Distances; and I do hereby declare the following to be a full, clear, and exact description of the invention, such as will enable others skilled in the art to which it appertains to make and use the same.

This invention relates to instruments for measuring distances, and while especially designed for use upon shipboard for ascertaining the distance of the vessel from a given object is also useful upon shore for a similar purpose.

The object of the present invention is to provide a simple, cheap, and reliable device by means of which the distance, as above indicated, may be accurately determined in a short space of time and without requiring any tedious calculations.

To the above end the invention consists in a measuring instrument embodying certain novel features and details of construction and arrangement of parts, as hereinafter fully described, illustrated in the drawings, and pointed out in the claims hereto appended.

In the accompanying drawings, Figure 1 presents a plan view of the measuring instrument constructed in accordance with the present invention, and Fig. 2 a sectional view on the line $x\ x$ of Fig. 1.

The improved instrument comprises an angle 1, the arms of which extend at right angles to each other. The device comprises three arms, 2 designating the longer arm and 3 the shorter arm, arranged parallel to, but spaced apart from, the arm 2, the arms 2 and 3 being rigidly connected by a cross-arm 4, arranged at right angles thereto and forming the base of the triangle used for calculating the distance of the given object from the point of operation.

5 designates a swinging arm or pointer which constitutes the hypotenuse of a right-angle triangle, the other two sides of which are formed by the arms 2 and 4, 4 constituting the short arm or base of the triangle and 2 the longer side or arm perpendicular to the base. The pointer 5 is pivotally connected to the device at the intersection of the portions 3 and 4.

7 designates a graduated arc which is connected at one end to the outer end of the arm 3 and at its opposite end to the intersection of the portions 2 and 4 of the device. This arc is graduated at both edges, as shown at 8, and the graduations are marked off in feet, yards, and miles or degrees. Secured to the swinging arm or pointer 5 is a curved extension or second arc 9. This arc is carried by the swinging arm and is also graduated upon its upper surface, as indicated at 10, the graduations being laid off in feet, yards, and miles or degrees and adapted, when the arm or pointer 5 is moved, to register with a line or mark on the stationary arc.

In operation the instrument is placed upon a table or other suitable support and the long arm 2 is pointed straight toward the object the distance of which is to be measured. The swinging arm 5 is adjusted so that it will point directly to the same object. When both of said arms are pointed toward the object, it is only necessary to note what graduation on the stationary arc the swinging arm tallies with, which will immediately indicate the distance, or it may be observed what particular graduation on the movable arm registers with the mark or line on the stationary arc, thereby arriving at the same result. Instead of providing the stationary arc with graduations representing feet, yards, and miles said arc may be provided with only the usual graduations indicating the degrees and fractions of degrees similar to an ordinary protractor, thus enabling the operator to calculate with certainty the angle of the arm 5 and thereafter to figure out the distance in a manner that will be readily understood.

The device is extremely simple, may be manufactured at a slight cost, and will be found of great convenience, especially in times of war, where it is desired to find out accurately the distance at which the enemy is located.

In order to prevent the swinging arm from lifting or moving out of contact with the arc 7, the arc 9 has its outer edge turned over to form a flange 10, which engages under the stationary arc 7 and prevents relative lateral movement between the two arcs while permitting the movable arc to slide around on the stationary arc.

Having thus described the invention, what is claimed as new is—

1. An instrument for measuring distances, consisting of a frame comprising parallel bars connected at their ends by a cross-bar, a stationary graduated arc secured at its opposite ends to said frame, a swinging arm pivotally connected to said frame, and a curved extension on said arm having a projection which extends around and beneath one edge of the stationary arc for maintaining the swinging arm in proper relation thereto, substantially as described.

2. An instrument for measuring distances consisting of a suitable horizontal frame comprising parallel bars connected by a cross-bar, a stationary arc secured at its opposite ends to said frame and provided with graduations as described, a swinging arm pivotally connected to said frame, and an arc attached to and carried by said swinging arm and having one of its edges bent to form a flange which embraces the stationary arc, substantially as and for the purpose described.

In testimony whereof I have signed this specification in the presence of two subscribing witnesses.

JOS. T. BROWN.

Witnesses:
LAURA BROWN,
IDA CONWAY.